Patented Jan. 12, 1932

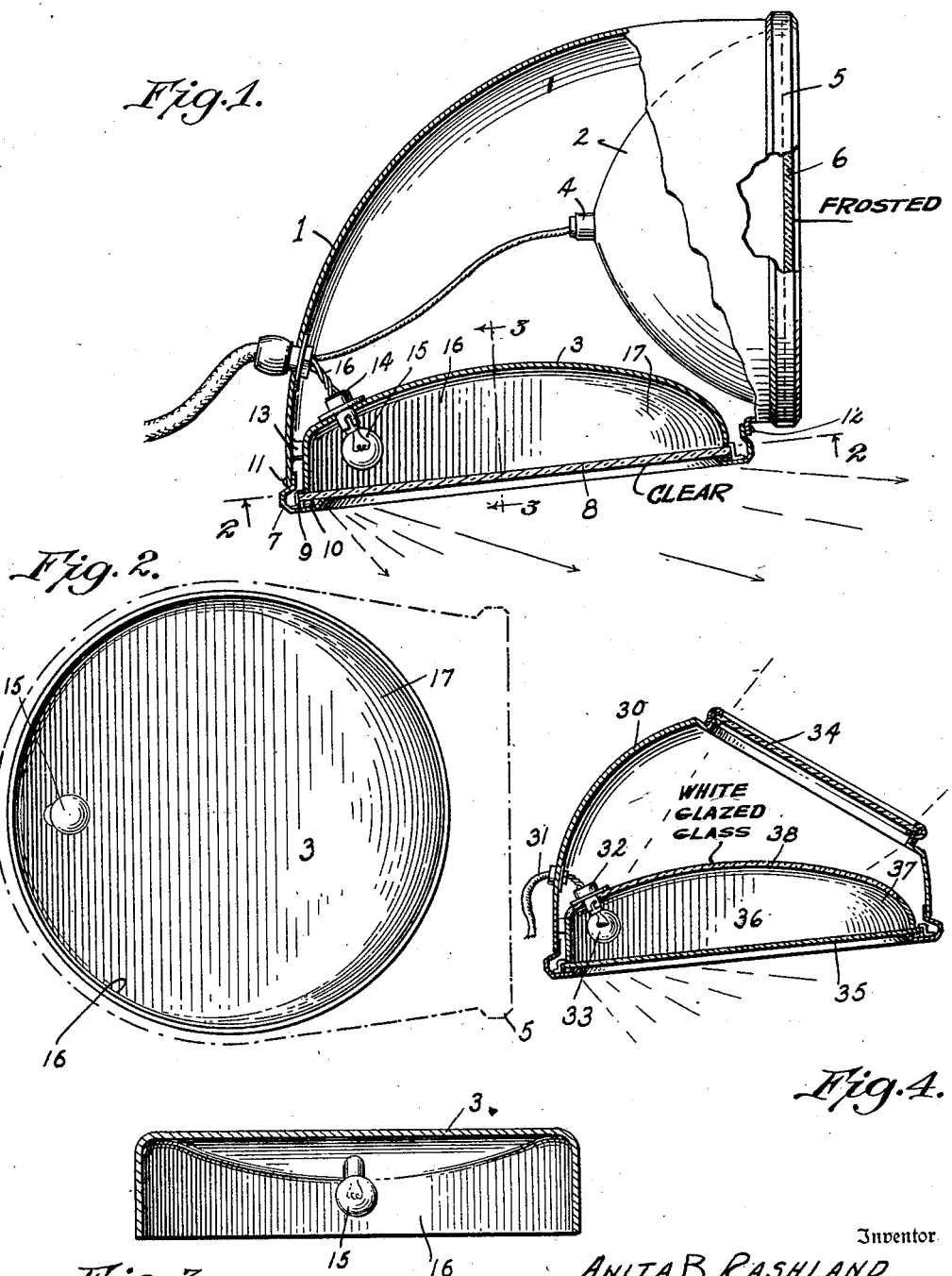

1,841,316

UNITED STATES PATENT OFFICE

ANITA B. RASHLAND, OF FREDERICK, MARYLAND, ASSIGNOR OF ONE-HALF TO LAWRENCE FAHRNEY, OF FREDERICK, MARYLAND

HEADLIGHT

Application filed February 18, 1931. Serial No. 516,787.

This invention, relating, as indicated, to an automobile headlight, is more particularly directed to the provision of means for illuminating a roadway in advance of a moving vehicle in such a manner that the driver of said vehicle can clearly see the road and any object thereon.

Another important object of this invention is to provide an illuminating means for an automobile which will not interfere in any way with the safe driving of an approaching vehicle.

After numerous experiments with various forms of reflectors I have found that the vertical walls of a curved reflector may be used most advantageously to focus and throw a light a considerable distance in advance of a vehicle, and that this light can be easily regulated so as not to interfere in any way with the approaching driver.

It may be well to note that in addition to simplicity in reflector construction I have avoided the use of more expensive lenses, and may use an ordinary clear glass in my headlight and yet provide a light which will meet with the most rigid headlight requirements of any State.

Specifically, the invention contemplates the provision of a headlight shell with two windows, one of which lies in a vertical plane and faces forwardly, while the other lies in a tilted horizontal plane and faces downwardly. The provision of two windows is made in order that my improved headlight will not appear to be a too radical departure from an ordinary headlight. In other words, the invention comprises the use of a means for projecting diffused light, similar to a conventional headlight, and in addition the emission of direct light projected in such a manner as to afford maximum illumination with a minimum or total absence of glare to the eyes of an approaching driver. Such diffused light is projected through the beforementioned vertical window which may be frosted, while the direct light is emitted through the horizontally tilted window.

In the modification of my improved device I have made use of one lamp which supplies both direct and diffused light by means of the peculiar construction of my novel headlight reflector. The means by which this last object is accomplished will be described more in detail as the description proceeds.

The annexed drawings and the following description set forth in detail certain mechanism embodying the invention, such disclosed means constituting, however, but one of various mechanical forms in which the principle of the invention may be used.

In said annexed drawings:—

Fig. 1 is a side elevation with certain parts in section; Fig. 2 is a sectional view taken on the line 2—2 of Fig. 1 in the direction indicated by the arrows; Fig. 3 is a vertical section taken on the line 3—3 of Fig. 1 in the direction indicated by the arrows; and Fig. 4 is a central vertical section of a modification of the headlight shown in Fig. 1.

Referring now to the drawings, and especially to Fig. 1, it will be seen that a headlight shell is provided with two reflectors 2 and 3, the former facing forwardly and the latter facing downwardly. The reflector 2 has a socket 4 for the reception of a lamp or bulb (not shown), the said lamp being adapted to project light through the frosted glass 6, said last named element being held to the shell 1 by means of collar 5.

A similar collar 7 is located at the lower portion of the shell and it is by this means that a clear glass 8 is secured to the shell. The collar 7 is provided with a conventional gasket 10 and struck up portions 9 so that a firm non-rattling grip is obtained upon the glass. The collar 7 is removably held in place by means of pins 11 and 12 which engage suitable slots in the shell and prevent undue removal of the collar and glass.

The reflector 3 is held in place by means of projections 13 on the shell 1, which are welded or otherwise secured to said reflector in such a manner as to fit the reflector in any desired position. Here it will be understood that other means of securing the reflector to the shell may be made use of and it would be within the scope of this invention to employ means which would allow for regulating the reflector at various angles.

A socket 14 is held in the base 3 of the reflector and at a point to the rear thereof adjacent the vertical wall 16 of said reflector. This socket 14 has a bulb or lamp 15 to provide light in the customary manner, and current is supplied to such a lamp by means of the wires 16.

The reflector itself consists of a circular vertical wall 16 and a base 3 with the vertical wall 16 and said base merging into a curved surface 17 at the forward portion of the reflector. The object in so curving the reflector is to direct the rays of light which are received at the forward portion thereof backwardly to the vertical wall 16, from which said rays will be projected forwardly to illuminate the roadway. All of the surfaces 3, 16, and 17 of the reflector are mirror surfaces with the vertical wall 16 doing most of the illuminating. However, the base has a very important function in directing light downwardly over a wide area so as to completely light up the wheels and surrounding area of the forward portion of the vehicle upon which the headlight is used. This is extremely important because the light thus directed does not interfere with the approaching driver, but on the other hand clearly outlines the machine for him, and is of immense benefit in that respect.

In the modification shown in Fig. 4 a downwardly directed reflector is shown, somewhat similar to the reflector in Fig. 1, but in this instance the base 38 is made of white glazed glass so that a certain amount of light will be transmitted through the said reflector while the remaining portion of light is reflected downwardly. In this instance, the walls 36 and 37 are similar to the walls 16 and 17 of Fig. 1 and perform the same function, namely, providing a means of direct illumination.

A lead wire 31 is shown entering a socket 32 in which a bulb 33 is retained, similar to the bulb 15 in the preferred embodiment.

As will be apparent from a comparison of Figs. 1 and 4, the object of the construction shown in Fig. 4 is to provide a suitable source of non-glaring illumination for headlights and also to make use of this same source as a means of providing diffused light so as to simulate a conventional automobile headlight. This object is attained by reducing the shell of Fig. 1 to approximately one half its size, resulting in the shell 30 shown in Fig. 4, and providing a window 34 in said shell which extends at substantially 45° to the horizontal. Obviously, when the current is switched on, light will be directed forwardly by the wall 36 and this light will provide the main source of illumination. At the same time a certain amount of light will penetrate the white glazed glass 38, and this light will project through the window 34 as diffused light, so that to an approaching driver the window 34 will appear to be the headlight of a conventional automobile.

From the preceding description it will be seen that my improved headlight consists of relatively very few parts and that the reflector has for its main reflecting surfaces vertical cylindrical surfaces so that expensive dies and other mechanism now in use are not necessary to produce said reflectors. At the same time it will be seen that the light projected from said reflector is sufficient to illuminate the road, and that such light is absolutely prevented from striking the eyes of an approaching driver.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as any invention:

1. A headlight comprising a shell, a reflector and a light source, said reflector facing downwardly and having a concave base and vertical cylindrical walls adapted to reflect light from said light source in a forward and downward direction, two windows in said shell lying in planes which extend at an acute angle to each other, one facing downwardly and covering said reflector and the other facing upwardly, the base of said reflector being semi-transparent, said light source located in said base adjacent the rear cylindrical walls, whereby rays of light will be transmitted through the semi-transparent base and outwardly through said upper window.

2. A headlight comprising a shell, a reflector, and a light source, said reflector facing downwardly and having a concave base and vertical cylindrical walls and being adapted to reflect light from said light source in a forward and downward direction, two windows in said shell, one facing downwardly and covering said reflector, the other facing upwardly, said base of said reflector being of white glazed glass, said light source located in said base adjacent the rear cylindrical wall whereby rays of light will be transmitted through said base and outwardly through said upper window.

3. A headlight comprising a shell, a reflector, and a light source, said reflector facing downwardly and having a concave base and vertical cylindrical walls and being adapted to reflect light from said light source in a forward and downward direction, two windows in said shell, one facing downwardly and tilting in a forward direction and covering said reflector, the other extending in a plane at approximately 45° to the horizontal, said base of said reflector being semi-transparent, said light source located in said base adjacent the rear cylindrical wall whereby rays of light will be transmitted through said base and outwardly through said upper window.

Signed by me, this 13th day of February, 1931.

ANITA B. RASHLAND.